No. 829,304. PATENTED AUG. 21, 1906.
W. M. TILTON.
FORK.
APPLICATION FILED SEPT. 18, 1905.
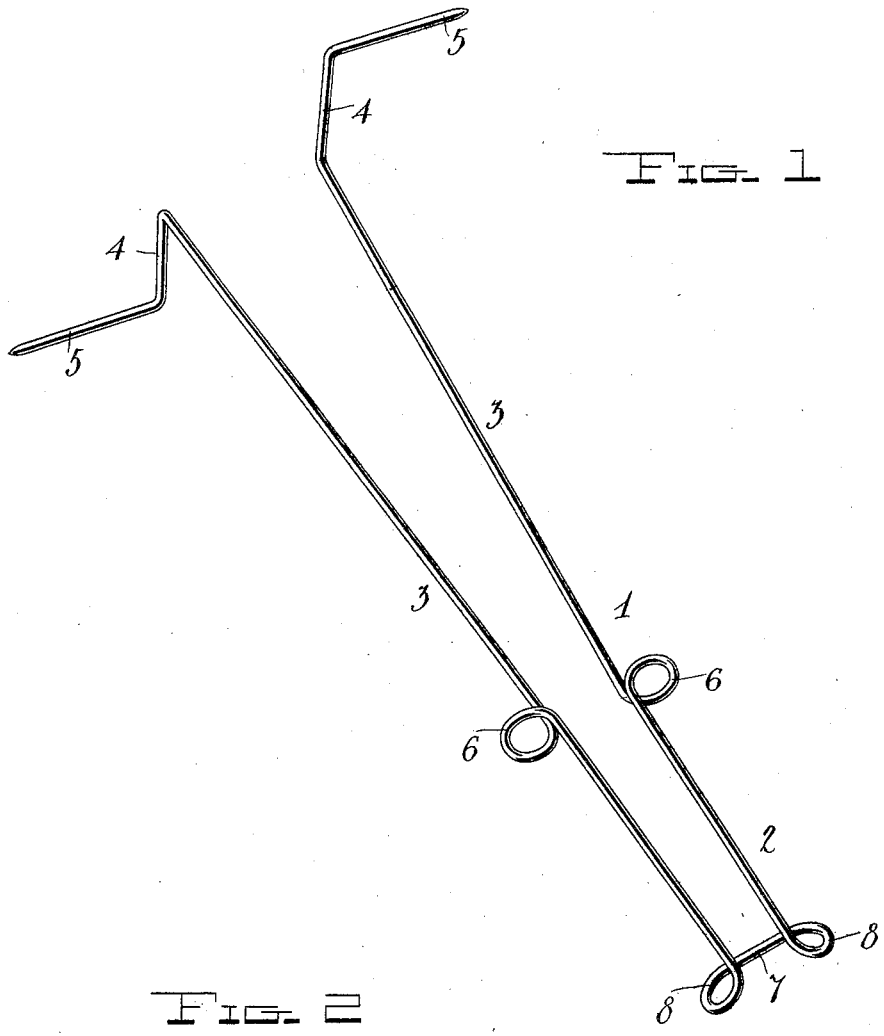
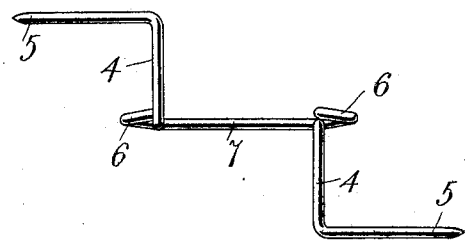
Witnesses
Inventor
W. M. Tilton
by H. B. Wilson
Attorney

UNITED STATES PATENT OFFICE.

WALTER M. TILTON, OF FRANKLIN, NEW HAMPSHIRE.

FORK.

No. 829,304.   Specification of Letters Patent.   Patented Aug. 21, 1906.

Application filed September 18, 1905. Serial No. 279,037.

*To all whom it may concern:*

Be it known that I, WALTER M. TILTON, a citizen of the United States, residing at Franklin, State of New Hampshire, have invented certain new and useful Improvements in Doughnut-Forks; and I do declare the following to be a full, clear, and exact description of the invention, such as will enable others skilled in the art to which it appertains to make and use the same.

This invention relates to improvements in forks.

The object of the invention is to provide a fork especially designed and adapted for use in frying doughnuts, whereby said doughnuts may be easily removed from the hot lard and allowed to drip without danger of the hands being burned. These and other objects are attained by means of the device illustrated in the accompanying drawing, in which—

The figure is a perspective view of a fork constructed in accordance with the invention.

Referring more particularly to the drawing, 1 denotes a fork which is preferably constructed from a single wire rod, bent or folded upon itself midway between its ends to form a handle portion 2 and substantially parallel bars or tines 3, the outer ends of which are bent laterally at right angles, as shown at 4, and upwardly to form prongs 5, which are pointed and which are adapted to be inserted through the holes or eyes in the doughnuts in lifting the same into and out of the frying-pan. The handle portion and the bars or tines 3 are separated by means of loops or eyes 6, which are formed by bending the wire and which are adapted to form stops which prevent the doughnuts on the bars or tines from slipping up onto the handle portion, and thus burning the hands. The looped or folded end of the rod is doubled or folded over upon itself, as shown at 7, to form eyes or loops 8, by which the fork may be hung up. By folding the looped end of the rod over as just described the fork will be materially strengthened at this point and an ornamental finish will be given to the same. In using the fork the ends 5 are inserted through the holes or eyes of the doughnuts when the same have been cooked and the doughnuts then allowed to slide upon the bars or tines 3, after which the fork may be rested upon the edge of the pan and the doughnuts allowed to drip.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A fork of the character described, consisting of substantially parallel bars or tines bent laterally and upwardly at one end, a handle formed at the opposite end of said fork, and means to prevent the doughnuts taken up on said bars from sliding onto the handle portion of the fork, substantially as described.

2. A fork of the character described formed of a single wire rod bent upon itself midway between its ends to form a handle portion, and substantially parallel bars or tines, laterally and upwardly bent pointed ends formed on said bars, eyes or loops bent therein adjacent to the handle portion to prevent the doughnuts taken up on said bars from sliding onto said handle portion, and eyes or loops formed on the handle end of the fork by bending or folding over the end of the same, substantially as described.

In testimony whereof I have hereunto set my hand in presence of two subscribing witnesses.

WALTER M. TILTON.

Witnesses:
  WILLIAM W. BUCHANAN,
  ENOS K. SAWYER.